Patented Apr. 13, 1937

2,077,041

UNITED STATES PATENT OFFICE 2,077,041

METHOD FOR RECOVERY OF OLEFINES FROM GASEOUS OR LIQUID MIXTURES

Harold S. Davis and Alfred W. Francis, Woodbury, N. J., assignors to Socony-Vacuum Oil Company, Incorporated, New York, N. Y., a corporation of New York No Drawing. Application March 9, 1934, Serial No. 714,820

13 Claims. (Cl. 260—170)

This invention is broadly directed to methods for the recovery of olefines from gases or liquid mixtures containing the same, and is specifically directed to the recovery of olefines and their separation from paraffinic compounds by preferential solution of the olefines in an aqueous solution of silver nitrate followed by separation of the olefines therefrom.

Prior to the present invention, certain inorganic salts in aqueous solution were known, which possess the power of dissolving or reacting with olefines to the more or less complete exclusion of paraffines. These compounds are mainly the soluble salts of silver, copper and mercury. The separation of olefines from a mixture of olefines and paraffines can be carried out for instance, with solutions of mercuric chloride, mercuric nitrate, silver nitrate, and cuprous chloride in solution with hydrochloric acid or with ammonia, or with ammonium chloride. Of these various reagents, the mercuric salts seem the least suited to a process where an olefine product is desired, because the reaction between these salts and the olefines is normally irreversible. All of the other salts above indicated, such as the salts of copper and silver, combine reversibly with olefines. Of these, the most effective agent is silver nitrate. Silver nitrate may be used either in acid or a neutral solution. The use of concentrated or saturated neutral aqueous solutions of silver nitrate, is preferred.

There is some uncertainty as to whether the so-called solution of olefines in silver nitrate solutions is a solution without chemical bond or an actual chemical reaction. There are strong points of evidence which would serve to point in either direction. For instance, the action resembles a physical solution in the following respects; the action of solution is quite rapid, all of the olefine dissolved may easily be extracted by purely physical means, as with an organic solvent, and it has been found that the amount of the olefine dissolved is roughly proportional to the pressure. The combination of gaseous olefine and aqueous silver nitrate solution appears to be entirely reversible in the sense that the amount of gas dissolved tends to follow the law of Henry and increase with increases of pressure, and the action may be reversed and the dissolved gas substantially entirely removed by a decrease of pressure to a sufficient extent. In the case of the mercuric salts for instance, it would be impossible to obtain this reversal of the solution reaction and remove the gases by merely decreasing the pressure. It has been found also that the specific solubility of propylene for instance, in concentrated silver nitrate, is greater than an equimolecular amount. On the other hand, it has been found the operation resembles a chemical reaction in that; the concentration of the propylene or other olefine dissolved seems proportional to the amount of silver ion present; the solutions present abnormal characteristics of density; no evolution of gas or formation of liquid droplets occurs upon freezing the solution, and the solvent reagents effective for olefines have very little solvent power for the physically similar paraffines, even when already containing dissolved olefines.

From the above diversity of data, it is difficult to pick an exact term to designate the operation of combining olefines with an aqueous solution of silver nitrate, but with the understanding that the word is used solely in the sense in which it is descriptive of the present operation, this operation will hereinafter be described as solution. The disclosed processes of the prior art furnish a satisfactory means for the solution of olefines in aqueous silver nitrate solution. Certain improvements in these methods are indicated herein, but broadly, this end of the operation is satisfactory. The major difficulty with the prior art processes of recovering olefines is with the steps of separating the olefines from the silver nitrate solution. Ethylene may be recovered from such solution by a reduction of pressure, its partial pressure at atmospheric temperatures being sufficiently high. It has been found that release of pressure to atmospheric is less efficient in the case of propylene and the butenes however, probably because of their lower vapor pressures. Thus, if one employs a hydrocarbon mixture containing 30% propylene at 20° C., it has been found that the partial pressure of the latter is about three atmospheres (30% of its vapor pressure, approximately 10 atmospheres). Reduction of pressure upon the solution in silver nitrate to one atmosphere would evolve only two-thirds of the dissolved propylene. In the case of butenes, there is substantially no evolution of gas at all, at atmospheric pressures. To avoid these difficulties it has been proposed, prior to the present invention, to heat the silver nitrate solution to expel the olefines therefrom. This procedure is highly unsatisfactory. In the first place, silver nitrate normally reacts with steel and most of the commonly used construction materials suitable for equipment for work of this sort, resulting in reduction and a certain loss of silver nitrate. Secondly, silver nitrate is peculiarly sensitive to the action of organic reducing agents which are almost invariably present in the butene fraction of cracking still gases, or other gases likely to be used as sources of olefines. This reducing action is multiplied manyfold at higher temperature, which is necessary to evolve the olefines as gases. Reduction by organic reducing agents and by ferrous metals and alloys results in the loss of silver nitrate from the system, and silver nitrate is a fairly expensive reagent. Attempts have been made to avoid this loss of silver nitrate by means of expensive construction materials in certain specialized base metal alloys, but so far, no way has been disclosed to enable the separation by heat to be carried out without substantial reduction or loss or silver nitrate. It is the provision of a method of solution and recovery free from these difficulties of the prior art, with which this invention is more particularly concerned, in addition to other important advantages.

This invention has had for its principal object the devising of a means whereby olefines in solution in an aqueous solution of silver nitrate can be recovered therefrom without the application of heat in any objectionable degree and without objectionable loss of silver nitrate. Another object of this invention is the provision of a process whereby the olefines can be recovered by bringing them into intimate contact with the silver nitrate solution under sufficient pressure to compress them to a relatively small volume, or preferably into the form of a liquid mixture, rather than as voluminous gaseous mixtures, whereby the volumes of reagent used, time of contacting, volume of equipment, and similar requirements, may be reduced and considerable economies made thereby. Further objects of this invention are the provision of a process wherein the olefines may be recovered in an especially convenient physical state fitted desirably for further processing, and various other objects and advantages as will hereinafter appear.

This invention comprises subjecting concentrated olefine fractions purified to a greater or less degree of paraffine hydrocarbons and preferably in a highly condensed or liquid form, to the solvent action of a saturated solution of silver nitrate in a silver lined vessel and the like, at relatively low temperature and under pressure sufficient to keep the olefine containing reagent in a highly condensed or liquid state at that temperature. This is then followed by extracting the olefines from the silver nitrate solution by a liquid agent which is a solvent for olefines, and it is preferred to conduct all the process steps in vessels, the inner surface of which consists of a metal which is not more electropositive than silver, such as gold, platinum or other noble metals and noble alloys immiscible with aqueous solutions of silver nitrate.

For instance, a liquid mixture containing propylene and propane, may be mixed with the aqueous solution of silver nitrate. The propylene is dissolved in the silver nitrate, and the propane separates therefrom because of immiscibility and insolubility. The enriched silver nitrate solution may then be mixed with such a solvent as hexane, and a substantial proportion of the olefines then passes from solution in the silver nitrate solvent to solution in the hexane solvent. This hexane solvent is then removed and subjected to distillation, which operation results in the recovery of the olefine in a very pure form.

As an example of the solvent power of silver nitrate solutions for olefines, the following table is presented:

| Olefines | Mols olefine per mol. silver nitrate | Volumes gas per unit volume solution |
|---|---|---|
| Propylene | 1.06 | 185 |
| Butene-1 | .67 | (approx.) 158 |
| Isobutene | .59 | 138 |
| Butene-2 | .19 | 39 |
| Pentene-2 | .10 | |
| Trimethyl-ethylene | .025 | |

The solvent used for the second extraction operation may in general be any solvent for olefines which is at the same time immiscible with aqueous solutions of silver nitrate, and differs sufficiently in boiling point from the desired olefine to render the recovery of the olefine from the second solution by distillation a comparatively easy operation. The required difference between the boiling point of the solvent and that of the recovered olefine is a function of the efficiency of the distillation equipment available for their separation. Very precise, high efficiency equipment might separate a solvent and solute differing about 10° C. in boiling points. Greater differences are necessary for less efficient equipment, and the range of difference in boiling points when commercial equipment is used should be from 25° C. to 100° C.

These solvents must also be sufficiently purified and of such nature as not to contaminate the silver nitrate solution, nor to introduce complications by way of products undesired in admixture with the recovered olefines. As examples of some solvents which may be used, and which have been found satisfactory, chloroform, carbon-tetra-chloride, benzol, and any of the paraffine hydrocarbon fractions of suitable boiling range may be named.

As an example of the way in which the present process operates, the following description of one embodiment of the invention is presented:

Starting for instance, with a refinery gas of the following analysis:

| Paraffines, etc. | | Olefines | |
|---|---|---|---|
| Hydrogen | 4.4% | Ethylene | 18.3% |
| Carbon monoxide | 0.3 | Propylene | 16.2 |
| Hydrogen sulfide, etc. | 0.4 | Isobutene | 1.8 |
| Methane | 21.5 | Butene 1 and 2 | 4.7 |
| Ethane | 13.3 | Diolefine | 1 |
| Propane | 10.4 | Pentene | 4.6 |
| Butane | 2.2 | | |
| Pentane | 0.8 | | |

This gas is given a wash with caustic soda solution to remove from it hydrogen sulfide and other sulfur compounds present in it in minute amount, which destroy the silver reagent by sulfur reaction. This caustic treatment may be either preceded or followed, preferably followed, by a scrubbing with dilute sulfuric acid to remove such compounds as diolefines, which are known to be reducing agents, and isobutene, which is not a reducing agent, but which is frequently an undesirable contaminant for the butene fraction. The gas is then treated by the known methods of scrubbing with various absorbent materials, followed by redistillation, these operations being conducted with the aim of deriving from the gas several fractions rich in olefines and discarding the rest of the gas to other uses. One of the fractions so separated is a propane-propylene mixture containing, if produced from the above gas, about 40% of propane and 60% of propylene, and this fraction is preferably held in liquid form under approximately 150 pounds pressure. A similarly produced fraction is the butane-butene fraction, which is comprised of about 32% butane, and 68% butenes-1 and 2. This is a liquid under about 30 pounds pressure at normal temperatures. It may be preferable to perform the acid treatment as above for the separation of reducing agents after fractional distillation rather than to treat the gases. A third fraction may be separated if desired, consisting of the gaseous fraction rich in ethylene, which may be subjected to recovery by solution in silver nitrate and separation therefrom upon reduction of pressure after the method of the prior art. The preparation of the raw material gas, if that gas originates in whole or in part from some process such as coal gasification or other source likely to contain ammonia, should include an acid washing of the gas for the separation of ammonia and similar reagents which react with the silver nitrate reagent.

Referring again to the above example of operation, the propane-propylene fraction may be contacted at atmospheric temperatures and under pressure sufficient to maintain it in liquid or highly condensed form, with a saturated solution of silver nitrate. This solution of silver nitrate may be made from the technical reagent, since it has been found that iron, copper, nickel, chromium, and similar impurities which may be present in technical silver nitrate, or apt to be introduced into a solution thereof by reaction with the containing equipment, are substantially harmless to the solution operation, even when present in quantities up to about 5% by weight of each of the four mentioned metals, or 20% total impurities. It has been found that silver fluoride is also an effective absorption reagent in aqueous solutions. The contacting of the silver nitrate and liquid hydrocarbon is preferably carried out in a countercurrent contacting apparatus of any of the ordinary forms, such as for instance, a tower packed with separating devices and the like, advantage being taken of the difference in specific gravities of the two reagents. This contacting operation may be continued until the silver nitrate solution takes up roughly 10% by weight of propylene leaving a propane liquid or condensed gas which is 90-100% pure, but the degree of extraction may be varied and is governed by economic considerations rather than chemical. Since this extracted propane liquid may contain traces of silver nitrate either dissolved or mechanically admixed in the form of a spray, it is desirable to scrub it with water, thus gradually collecting a valuable reagent which otherwise would be lost. The propylene so dissolved in the silver nitrate is substantially free from propane, since it has been found that the silver nitrate solution exerts very little solvent power for propane. The enriched silver nitrate solution may then be contacted in another tower similar in character, with a narrow cut petroleum fraction having the boiling point and the general characteristics of hexane. Liquid butane, pentane, hexane, heptane, octane, or their isomers, or any mixture of them, or even heavier hydrocarbons may be used, the characteristic being capability of dissolving olefine, and sufficiently different boiling point from the olefine recovered to permit separation by distillation. Other materials, such as chloroform, carbon-tetrachloride, benzol and others which fulfill the above requirement may be used. Of these, hexane or an equivalent mixture of hydrocarbons is the one most conveniently usable. Hexane has a boiling point of 68° C. Propylene has a boiling point of −47° C. at the same pressure, and we find this difference in boiling points sufficiently great to promote easy and complete separation of propylene from the hexane solvent. In general, we may use any water-immiscible, inert (i. e., non-reducing and neutral or slightly acidic) solvent which boils at a temperature of say 10° C. to 100° C. different from the desired olefine, but this difference may be varied, the choice being dictated solely by distillation conditions. The hexane solvent and the silver nitrate solution are contacted countercurrently under the same pressure of approximately 150 pounds, and at atmospheric temperatures, and this contacting results in the production of a silver nitrate solution practically free from propylene, that is, it is sufficiently freed from propylene so that it may be used again as a solution reagent without impairment of efficiency, and this procedure is preferred. The hexane propylene mixture is then passed to a distillation system of usual type and design, wherein the propylene is separated from the solvent, the propylene so obtained being of a high degree of purity and the denuded hexane solvent being recirculated to the second extraction step. The butane-butene fraction may be contacted and re-extracted under exactly similar conditions, except that the pressure necessary to hold this fraction in liquid form is only approximately 30 pounds at atmospheric temperatures. The result of this operation is a mixture of butenes 1 and 2, provided the starting mixture is freed of isobutene. Of interest in this connection is the fact that as indicated in the table previously quoted, butene-1 is appreciably more soluble than butene-2, and once a mixture of the two butenes has been secured, repetitions of this process may be used to concentrate these two butenes with respect to each other, should such a result be desirable. Similarly, by this invention, ethylene and propylene can be recovered separately from a mixture containing both. The purified gas mixture, preferably under pressure just insufficient to liquefy propylene content in it, is first contacted countercurrently with aqueous silver nitrate solution, extracting practically all the ethylene and propylene. The solution is then re-extracted countercurrently under pressure with a solvent such as hexane. This removes all of the propylene from the silver nitrate solution, and only a small portion of the ethylene, because the latter is much less soluble in the hexane than is propylene, whereas in the silver solution, the reverse is true. The remaining ethylene is then evolved by releasing the silver nitrate solution to atmospheric pressure. Moderate evacuation also may be used. If the small amount of ethylene in the propylene is objectionable, it may be removed by fractional distillation under pressure in the same operation used for separating the propylene from the hexane.

This process may be used for the recovery of all of the usually desired olefines, and may further be used by taking advantage of the varying solubilities of the olefines under the conditions shown, to separate those olefines one from another. As a further advantage, it may be seen that this process is entirely continuous in operation, as over and above those operations for the handling of raw material which must be common to all processes, it consists merely of two countercurrent scrubbing operations, the first of which is preferably liquid to liquid, but may sometimes be liquid to gas, the second of which is always liquid to liquid, and the third of which is a comparatively simple distillation operation. As a further advantage, this process is free from operations wherein construction materials known to react or reduce heated silver nitrate solutions, are exposed to silver nitrate solutions under heat, with resulting loss of silver nitrate. Many of these advantages are inherent in the present invention largely because of the introduction of the step of extracting the olefines from the silver nitrate solution with a liquid solvent possessing the characteristics or properties described above. Other important advantages of the invention result from the employment of pressures on the olefine-containing gases being treated, sufficient to compress them into a relatively small volume and preferably sufficient to liquefy them. Additional advantages of the invention result from the employment of silver-lined vessels or containers for the silver nitrate solution, and in this connection it has been discovered that vessels or containers lined or interiorly coated or plated with a metal which is not more electropositive than silver are suitable for the invention. Such linings or coatings may consist of silver, gold, platinum, and alloys possessing the general properties of a noble metal. Further advantages are evident from the foregoing description of the invention.

Silver nitrate has been used throughout this specification in solely an exemplary manner, and it is not desired to limit the invention thereby, but to extend it to operation with any of the metallic salts capable of reversible combination with olefines, subject only to the limitations of the claims.

We claim:

1. In the method of separating lower olefines from hydrocarbon compositions containing the same by means of a reducible metal salt capable of reversibly combining with the olefines in an aqueous solution which is in intimate contact with a reducing metal, the steps which comprise bringing the hydrocarbon composition into intimate contact with the aqueous solution for the transfer of olefines into such aqueous solution and extracting the olefines from the aqueous solution by means of a water-immiscible, inert liquid solvent, at temperature below that at which substantial reduction of the soluble metal salt by the reducing agent takes place, and subsequently separating the olefine from the liquid solvent.

2. In the method of separating lower olefines from hydrocarbon compositions containing the same by means of a reducible metal salt capable of reversibly combining with the olefines in an aqueous solution which is in intimate contact with a reducing metal, the steps which comprise bringing the hydrocarbon composition into intimate contact with the aqueous solution for the transfer of olefines into such aqueous solution and extracting the olefines from the aqueous solution by means of a water-immiscible, inert liquid solvent having a boiling point sufficiently different from the recovered olefine to enable its separation therefrom by distillation, at temperature below that at which substantial reduction of the soluble metal salt by the reducing agent takes place, and subsequently separating the olefine from the liquid solvent by distillation.

3. In the method of separating gaseous lower olefines from liquid hydrocarbon compositions containing the same by means of a reducible metal salt capable of reversibly combining with the olefines in an aqueous solution which is in intimate contact with a reducing metal, the steps which comprise bringing the liquid hydrocarbon composition into intimate contact with the aqueous solution for the transfer of olefines into such aqueous solution, and extracting the olefines from the aqueous solution by means of a water-immiscible, inert liquid solvent, performing these steps at temperature below that at which substantial reduction of the soluble metal salt by the reducing agent takes place, and under sufficient pressure to maintain the olefine in solution in the liquid hydrocarbon composition, aqueous solution, and solvent, and subsequently separating the olefine from the liquid solvent.

4. That method of recovering lower olefines from combination with an aqueous solution of silver nitrate which comprises contacting the aqueous solution with a water-immiscible, inert liquid solvent capable of dissolving olefines, and separating the olefine and the liquid solvent.

5. That method of recovering lower olefines from combination with aqueous silver nitrate solutions which comprises contacting the aqueous solution with a water-immiscible, inert liquid solvent capable of dissolving olefines and differing sufficiently therefrom in boiling point to permit of separation by distillation, and separating the olefine from the liquid solvent by distillation.

6. In the recovery of lower olefines from hydrocarbon mixtures containing them, the steps which comprise contacting the hydrocarbon mixture at low temperature and high pressure with an aqueous solution of a metal salt capable of reversibly combining with the olefines, contacting the aqueous solution at temperatures of the order of atmospheric temperature with a water-immiscible liquid solvent capable of dissolving the olefine from the aqueous solution, and separating the olefine from the liquid solvent.

7. In the method of separating lower olefines from hydrocarbon compositions additionally containing organic reducing agents by means of a reducible metal salt capable of reversibly combining with the olefines in an aqueous solution, the steps which comprise substantially removing the reducing agent from the hydrocarbon composition, bringing the hydrocarbon composition into contact with the aqueous solution, extracting the olefines from the aqueous solution by means of a water-immiscible, inert solvent, and separating the olefine from the solvent.

8. In the method of separating lower olefines from hydrocarbon compositions containing the same by means of a reducible metal salt capable of reversibly combining with the olefines in aqueous solution which combines reversibly with the olefines, the steps which comprise bringing the hydrocarbon mixture into contact with the aqueous solution, contacting the olefine containing aqueous solution with a water-immiscible, inert liquid solvent capable of dissolving olefine therefrom, and separating olefine from the liquid solvent, and maintaining the aqueous solution when within the system in contact with restraining means the interior surface of which consists of a metal not more electropositive than the metal of the metal salt used.

9. In the method of separating lower olefines from hydrocarbon compositions containing the same by means of a reducible metal salt capable of reversibly combining with the olefines in aqueous solution which combines reversibly with the olefines, the steps which comprise bringing the hydrocarbon mixture into contact with the aqueous solution, contacting the olefine containing aqueous solution with a water-immiscible, inert liquid solvent capable of dissolving olefine therefrom, and separating olefine from the liquid solvent, the contacting of the hydrocarbon composition and aqueous solution and the contacting of the aqueous solution and liquid solvent being carried out in a continuous countercurrent manner.

10. In the method of separating lower olefines of similar boiling points, the steps of contacting hydrocarbon mixtures containing the olefines to be separated with an aqueous solution of a metal salt capable of combining reversibly with the olefines and preferentially combining with one of the olefines to a greater extent, contacting the aqueous solution with a liquid solvent for olefines which is non-miscible with water and inert toward the metal salt, and separating the olefine and solvent whereby the separated olefine mixture is relatively richer, and the residual hydrocarbon mixture is relatively leaner in the olefine for which the metal salt has a preferential tendency.

11. In the method of recovering and separating lower olefines from hydrocarbon mixtures the steps of contacting the hydrocarbon mixture with an aqueous solution of a metal salt capable of reversibly combining with olefines, said contacting being performed at low temperature and high pressure, contacting the aqueous solution with a liquid solvent for olefines which is immiscible with water, inert toward the metal salt, of a boiling point different from the olefines, and having preferential solvent power for olefines higher than ethylene, separating the olefines one from another and from the liquid solvent by a process of distillation, and then releasing the pressure upon the aqueous solution and recovering ethylene by evaporation therefrom.

12. In the method of recovering lower olefines from hydrocarbon mixtures containing them, the step which comprises contacting the hydrocarbon mixture with an aqueous solution of silver fluoride, and subsequently separating the olefine from the silver fluoride solution.

13. In the method of recovering gaseous lower olefines from liquid hydrocarbon mixtures containing them by means of an aqueous solution of a metal salt capable of reversibly combining with the olefines, said mixtures containing also a reducing agent capable of precipitating a substantial amount of the metal from the solution of the said metal salt at elevated temperatures, which liquid mixtures are normally gaseous, the step which comprises contacting the liquid hydrocarbon mixture with an aqueous solution of said metal salt, under a pressure sufficiently great to maintain the said hydrocarbon mixture as a liquid, at a temperature below that at which substantial reduction of the metal salt takes place and separating the olefines from the said aqueous solution by means of a water-immiscible, inert liquid solvent.

HAROLD S. DAVIS.
ALFRED W. FRANCIS.